United States Patent [19]
Brubaker

[11] Patent Number: 5,744,573
[45] Date of Patent: Apr. 28, 1998

[54] ELECTROSTATIC DISSIPATIVE NYLONS

[76] Inventor: Larry C. Brubaker, 449 Hartz Rd., Fleetwood, Pa. 19522

[21] Appl. No.: 736,999

[22] Filed: Oct. 25, 1996

[51] Int. Cl.⁶ .................. C08G 69/08; C08G 73/10
[52] U.S. Cl. ............ 528/310; 528/48; 528/61; 528/66; 528/312; 528/322; 528/323; 528/326; 528/422; 524/606
[58] Field of Search ................. 528/322, 312, 528/48, 66, 61, 323, 310, 326, 422; 524/606

[56] References Cited

U.S. PATENT DOCUMENTS 4,831,098  5/1989  Watanabe et al. ............... 528/45
4,882,894  11/1989 Havens et al. .................. 524/606
5,025,922  6/1991  Havens et al. .................. 524/606

Primary Examiner—P. Hampton-Hightower
Attorney, Agent, or Firm—Richard O. Church

[57] ABSTRACT

A method for the anionic polymerization of a lactam which produces an nylon having a surface resistivity of between about $10^6$ to about $10^{12} \Omega/\square$. Miscible antistatic agents are mixed with the lactam and the moisture concentration in the lactam is adjusted to about 0.4 wt %. When required to complete the polymerization, the initiator concentration in the lactam is adjusted to about 1 wt %.

4 Claims, No Drawings

ELECTROSTATIC DISSIPATIVE NYLONS

BACKGROUND OF THE INVENTION

A. Field of the Invention.

This invention relates to electrostatic dissipative nylons and, more particularly, to a cast nylon 6 having a conductivity less than that of metallic conductors and greater than that of nonmetallic insulators. The electrostatic dissipative nylons of the invention are prepared by disbursing antistatic agents in a lactam monomer prior to polymerization. The nylons made by this invention have permanent electrostatic dissipative properties that are not adversely affected by surface attrition or by fluctuations in ambient conditions. Priority is claimed based upon Provisional Patent application Ser. No. 60/008,065 filed on Oct. 30, 1995.

B. Definitions.

For purposes of this specification and the appended claims, the following are defined terms.

a. Antistatic Agent. A material which can increase the conductivity of a plastic.

It may be incorporated into a plastic or coated over the surface of a plastic.

b. Resistivity. Resistivity is a measure of the resistance to the flow of an electric current and is measured either as a surface or a volume phenomenon. Resistivity and conductivity are inversely related to each other. It follows that high values of resistivity indicate high resistivity and low conductivity and that low values of resistivity indicate low resistivity and high conductivity. Surface resistivity is expressed in ohms per square ($\Omega/\square$) and is usually measured at the surface of a material at room temperature. Information detailing methods for quantifying surface resistivity is given in ASTM D257.

c. Conductor. A material which has a surface resistivity less than about $10^5 \Omega/\square$.

d. Insulator. A material which has a surface resistivity greater than about $10^{13} \Omega/\square$.

e. Electrostatic Dissipative Material (ESD). A plastic material that has a surface resistivity between that of a conductor and an insulator, usually defined as between about $10^6$ and $10^{12}$ $\Omega/\square$.

C. Discussion of the Prior Art.

Every major plastic resin is, in its natural state, an electric insulator and many have a significant tendency to accumulate static electric charges. The ability of plastics to form and retain charges of static electricity on their surfaces is well known. For example, it is the presence of static electrical charges on sheets of thermoplastic film that often cause the sheets to stick to each other.

There exists a need for electrostatic dissipating polymeric compositions having intermediate resistivities. One particular need is for a polymeric composition that has sufficient resistivity to "bleed off" or dissipate static charges but has sufficient resistivity to prevent a charge from moving too quickly through the composition and cause an arc or spark.

When the surface resistivity is less than or equal to about $10^5 \Omega/\square$, a composition has very little insulating ability and is generally considered a conductor. Such compositions are generally poor electrostatic dissipating polymeric materials because the speed of bleed off is too rapid and sparking or arcing may occur.

When the surface resistivity is greater than about $10^{12} \Omega/\square$, a composition is generally considered to be an insulator and the composition is a poor electrostatic dissipating material.

When the surface resistivity of a material is in a range of from about $10^5$ and $10^{12}$ a charge of any significant electric potential will dissipate or decay in a controlled manner. As defined before, a material having this conductivity is referred to as an electrostatic dissipative material, or, more simply, as an ESD. It is with such materials that this invention is concerned.

Static charge decay rates measure the ability of an electrostatic dissipating material to dissipate a charge. Decay times are measured at a prescribed relative humidity (e.g. 15%) and usually at room temperature by placing a charge of a known potential on the surface to be tested and measuring the time it takes for the charge to dissipate to a given lower potential. For example, a 90% decay time indicates that a 5 Kvolt charge placed on an article's surface requires a measured length of time (in seconds) for the charge to dissipate by 90%, that is, down to 500 Volts. The National Fire Protection Association standard (NFA Code 56A) requires 0.5 seconds as an upper limit for 90% decay time and the US Military Standard (MIL-813705B) requires 2.0 seconds as an upper limit for a 99% decay time.

The increased complexity and sensitivity of microelectronic devices makes the control of static discharge of particular concern in the electronic industry. Even a low voltage discharge may cause damage to sensitive devices. The need to control static charge buildup by dissipation may require the total assembly environment to be constructed of electrostatic dissipative materials. It may also require that materials used in storing, handling and shipping electronic devices be made from electrostatic dissipative materials. Tote boxes, strapping tape and shipping containers are examples.

The prevention of the buildup of static electrical charges which accumulate on plastics during manufacturing or use can be controlled through the use of several kinds of antistatic agents. One kind of antistatic agent is applied as a coating on the surface of a plastic. Another kind of antistatic agent is incorporated into the mass of a plastic either by melt mixing the antistatic agent with the plastic or by mixing the antistatic agent with a monomer and polymerizing the mixture.

One approach to the manufacture of ESD materials has been to fill the plastics with conductive materials like carbon black, metal fibers, carbon fibers, etc. This approach advantageously provides high conductivity, rapid static dissipation, reliability and permanence. The disadvantages of using these materials is that they often reduce the mechanical properties of the plastic materials at the loadings that are needed and, as is the case with carbon black, may make it difficult to color the composite material.

Conductive fillers can be difficult to disperse uniformly throughout a plastic matrix. Lack of uniformity can create "hot spots" within a plastic matrix where arcing or damaging static discharge can occur. Some effective fillers like carbon fibers are relatively expensive while less expensive metal fibers cause excessive wear and abrasion to the flights of the screws in mixing extruders.

More recently, attention has been focused upon the use of synthetic organic materials as antistatic agents. These antistatic agents can range from low molecular weight compounds to comparatively high molecular weight compounds and polymeric materials.

Organic antistatic agents can be topically applied as a coating that is sprayed or dip coated on the surface of a plastic. The same effect can be achieved by incorporating the surface active antistatic agents into a plastic matrix and relying on the migration (blooming) of the antistatic agent to the surface of the plastic. Surface active antistatic agents are sometime unreliable in performance because they lack long term adhesion and they may interfere with surface properties. Some surface antistatic agents are hygroscopic and depend upon moisture from the surrounding air to form a conductive layer of water on the surface of an article. Their effectiveness will vary with changes in the relative humidity.

Antistatic agents are available in the form of comparatively low molecular weight organic materials which can be blended with the plastic by melt mixing. Not uncommonly, however, low molecular weight electrostatic agents suffer from poor heat stability and, depending on the melting point of the base resin, they may not survive melt processing temperatures. Low molecular weight antistatic agents can be difficult to incorporate into a plastic matrix. The moldability of the plastic may be adversely affected because low molecular weight antistatic agents can migrate (bloom) to the surface of the molded article. Surface migration may impair the appearance and tactile properties of an article.

Higher molecular weight organic antistatic agents are available but here the miscibility of the antistatic agent with the base resins often becomes a problem. In addition to physical incompatibility (poor miscibility), chemical incompatibility may cause problems. It is known that some organic antistatic agents are thermally unstable or chemically incompatible with a polymer at processing temperatures and cause unacceptable degradation to or enter into unwanted side reactions with the host polymer. This is especially so with more complex host resins such as polyesters and polyamides.

To incorporate an antistatic agent into a plastic matrix by melt mixing, a feed hopper of an extruder can be charged with an antistatic agent and a plastic, the plastic is melted in a melting zone of the extruder and the melted mixture advanced to a mixing zone. Shear forces generated in the mixing zone will wet out and disperse the antistatic agent if it is a solid, and, if the antistatic agent is a liquid under the process conditions, a liquid dispersion or solution is formed. The extrudate discharged from the extruder is solidified and cut or diced into molding pellets of used as the extruded shape.

Another means for incorporating an antistatic agent into a plastic matrix is to disperse the antistatic agent in a monomer prior to the polymerization of the mixture. If the antistatic agent is miscible in the monomer and is chemically unreactive in the polymerization process, this method works well. When, however, the antistatic agent is immiscible with the monomer, special care may be required. If the antistatic agent is not soluble in the monomer and they are of different densities precautions may be required to avoid gravimetric separation during the slower phase or polymerization when the viscosity of a monomer is low. (Note that this problem is usually not present when solid antistatic agents are mixed with a melted polymer in an extruder. First, since the melt viscosity of a polymer is much greater than that of its monomer gravimetric separation is inhibited and second, the elapsed time from the moment the mixture of molten polymer and solid antistatic agent are discharged from the mixing zone of an extruder and the moment the mixture is solidified is quite small, usually a matter of only a few seconds).

The invention as disclosed and claimed in this application, is a process in which an antistatic agent is mixed with liquid lactam monomer prior to polymerization and an anionic polymerization of the lactam is conducted below the melting point of the polymerized nylon. This polymerization can utilize, for example, ε-caprolactam to yield nylon 6 or ω-lauryl lactam to yield nylon 12.

OBJECTS OF THE INVENTION

Accordingly, it is an object of this invention to increase the conductivity of nylon.

A more specific object is to provide a nylon with antistatic properties utilizing the anionic polymerization of a lactam.

Another object of this invention is to incorporate an antistatic agent in a polymeric matrix made from a lactam in which the antistatic agent is uniformly dispersed throughout the matrix.

Yet another object of this invention is to provide a electrostatic dissipative material of nylons 6 or 12 that is not dependent upon ambient moisture for its antistatic properties. A still further object of this invention is to provide a method for centrifugally casting electrostatic dissipative nylon articles at reaction temperatures.

These and other objects of this invention are achieved by mixing a miscible liquid antistatic agent with a lactam and polymerizing the lactam by known anionic methods. Since the antistatic agent is miscible in the lactam monomer, the properties of volume and surface resistivity are quite uniform when measured at different points in and on the polylactam and they do not settle out to any marked degree even when spin casting polymerization techniques are used.

The antistatic agents effective in the invention are believed to be chemical active in the polymerization reaction environment and are known to slow or inhibit polymerization below acceptable limits. It has now been discovered that useful polymerizations can be carried out and the desired reduction in resistivity can be obtained if the amount of catalyst and initiator used in the polymerization reaction are significantly increased.

One preferred class of liquid antistatic agents useful in the practice of the invention is sold by B. F. Goodrich under its trade designation Statrite®. These antistatic agents are described as chain extended low molecular weight polyoxiranes polymers. They are disclosed in patents held by B. F. Goodrich including U.S. Pat. Nos. 5,023,036; 5,159,053; 5,237,009; and 5,342,889.

The patents and the literature describing the Statrite® polymers instruct the user that the polymers must be in a thoroughly dry condition, i.e. moisture levels at and below 0.2wt %. Surprisingly, it has now been found that the beneficial properties of increased conductivity are not achieved in the anionic polymerization of lactams unless the moisture content of the polymers is at least about 0.4wt %. Since the catalyst most commonly used is sodium, which is reactive with water, even the presence of less than 0.2% water by weight is considered sufficient to poison the polymerization reaction. It is therefore contrary to the teachings of the manufacturer of the Statrite polymers and surprising that the desired reduction in resistivity is achieved only by increasing the moisture content of the Statrite by about two times over the maximum amount recommended by the supplier. To overcome this increase in moisture level which poisons the catalyst, it has proven necessary to increase the concentration of the catalyst used in the polymerization by a factor of more than two and preferably about three.

Another antistatic agent which has proven useful in lactam polymerizations is sold by ICI under its trade designation Atmer® 163 which is identified in ICI's literature as N,N-Bis(2hydroxy-ethyl) alkylamine. As is the case with the wet Statrite®, it is surprising that the anionic polymerization can proceed successfully when Atmer® is used. This is true since Atmer is a substituted amine of a type which is recognized as a modifiers or chain stoppers in the anionic polymerization of nylon. This is discussed in detail, for example, In U.S. Pat. No. 3,017,392. Probably, for this reason, if Atmer® is used as an antistatic agent, it has been found that the polymerization reaction will not proceed at a usefully rapid rate. It has now been discovered that Atmer® can be used in quantities sufficient to reduce the resistivity of the polymer if the amounts of catalyst and initiator are used in greater quantities, that is, at least several fold above normal.

Reference is made to other processes in which conductive fillers are incorporated during the anionic polymerization of lactams in which, however, the antistatic agents do not become involved with the chemistry of the polymerization. U.S. Pat. Nos. 5,084,504 and 5,179,155 disclose the addition of 2 to 40% by weight of spherical or substantially spherical fine carbon particles having a specific gravity of from 1.4 to 1.6 and an average particle size of from 5 to 25 microns. While these processes represent an advance over the prior art, they necessarily cannot achieve complete homogeneity of the carbon particles in the lactam matrix, due in a large measure to the difference in densities, and as a result the surface resistivity will be greater at the top of a casting than it is at the bottom of the same casting. The difference in densities also makes it impractical to form shapes by centrifugal casting as all of the carbon particles are impelled to the outside layer of the casting.

The amount of the antistatic agent added to the nylon monomer is not critical and will be determined by the reduction in the surface resistivity that is desired. Generally the addition of between 1 to 20 wt % of the antistatic agent will suffice to reduce the surface resistivity to the range of from about between about $10^6$ and $10^{12}$ Ω/□ and, more preferably, to about $10^9$ to about $10^{11}$ Ω/□.

EXAMPLES

In the following examples standard conditions where used for the anionic polymerizing ε-caprolactam. The lactam monomer was thoroughly dried to a moisture level below 0.2 wt % and an effective amount of initiator (hexamethylene diisocyanate) and catalyst (NaH) were mixed into the monomer. The mixture was heated to rapid anionic polymerization temperatures (about 345 degrees F) and the time of the polymerization was noted. (For the herein purposes the time of polymerization is reported as the time from initiation at 325 degrees F until the exotherm causes the temperature to reach 375 degrees F. By this time a substantially solid polymer has been formed although it is to be understood that the polymerization is not yet fully complete.)

Test pieces in the form a 2" diameter, 2.5" thick discs were cast. After they had cooled to room temperature and before they could absorb any significant moisture, their resistivity was measured on a Pinion Corporation Model SRM 110 surface resistivity machine.

EXAMPLE I

A conventional anionic polymerization of ε-caprolactam was conducted. A reactive mixture was prepared using 0.297% by weight hexamethylene diisocyanate and 0.053% by weight NaH based upon Na. The reaction was initiated at a temperature of 320 degrees F and it reached completion (i.e. 375 degrees F) within 60 seconds. The surface resistivity of the disc was measured after it had been removed form tits mold and cooled to room temperature and was determined to be greater than $10^{13}$ Ω/□.

EXAMPLE II

The polymerization of Example I was repeated except that 2 wt % of ATMER® 163 was included in the polymerizable mixture. The reaction did not proceed at a useful rate and so the initiator was increased to 0.99 wt % and the catalyst increased to 0.185 wt %. In this latter instance a satisfactory polymerization time of 50 seconds was achieved. The surface resistivity was measured at several different spaced locations on the surface of the sample and was found to be in a range of from $10^9$ to $10^{12}$ Ω/□.

EXAMPLE III

The polymerization of Example I was repeated except that 8.5 wt % STATRITE® C-2300 was included in the polymerizable mixture. The reaction proceeded at a useful rate but the surface resistivity of the sample produced was in excess of $10^{13}$.

EXAMPLE IV

The procedure of Example III was duplicated except the moisture content of the monomer was increased to about 0.4 wt %. At this moisture level the reaction did not proceed at a useful rate and so the initiator was increased to 0.99 wt % and the catalyst increased to 0.185 wt %. In this latter instance a satisfactory polymerization time of 90 seconds was achieved. The surface resistivity was measured at several different spaced locations on the surface of the sample and was found to be in a range of from $10^{10}$ to $10^{12}$ Ω/□.

I claim:

1. A method for reducing the surface resistivity of polylactams by incorporating an antistatic agent which is miscible in lactam monomer at polymerization temperatures in a lactam and conducting an anionic polymerization of the lactam characterized in that the anti static agent is N,N-Bis (hydroxy ethyl) alkylamine or a chain extended low molecular weight polyoxirane and the moisture contained in the lactam monomer is at least 0.4 wt %.

2. A method for the anionic polymerization of a lactam monomer to yield a nylon having a surface resistivity in the range of from about $10^6$ to about $10^{12}$ Ω/□ in which a sodium catalyst and an isocyanate initiator are added to the monomer and the polymerization is conducted above the melting point of the monomer but below the melting point of the nylon, the improvement comprising:

adjusting the catalyst concentration of the monomer to about 0.2 wt %;

adjusting the moisture concentration of the monomer to about 0.4 wt %;

dispersing a miscible antistatic agent within the monomer; and polymerizing the lactam monomer.

3. A method according to claim 2 wherein the antistatic agent is N,N,-Bis(hydroxyethyl) alkylamine.

4. A method according to claim 2 wherein the antistatic agent is a chain extended polyoxirane and the initiator concentration of the lactam monomer is adjusted to about 1 wt %.

* * * * *